April 28, 1964  T. FLATOW  3,130,809
METHOD AND APPARATUS FOR GENERATION OF SEISMIC WAVES
Filed March 8, 1961  2 Sheets-Sheet 1

INVENTOR.
TOBIAS FLATOW,
BY John B. Davidson
ATTORNEY.

April 28, 1964     T. FLATOW     3,130,809
METHOD AND APPARATUS FOR GENERATION OF SEISMIC WAVES
Filed March 8, 1961     2 Sheets-Sheet 2

INVENTOR.
TOBIAS FLATOW,
BY John B. Davidson
ATTORNEY

United States Patent Office 3,130,809
Patented Apr. 28, 1964

3,130,809
METHOD AND APPARATUS FOR GENERATION OF SEISMIC WAVES
Tobias Flatow, Houston, Tex., assignor, by mesne assignments, to Jersey Production Research Company, Tulsa, Okla., a corporation of Delaware
Filed Mar. 8, 1961, Ser. No. 94,177
3 Claims. (Cl. 181—.5)

This invention relates generally to seismic prospecting, and more particularly to the generation of seismic impulses at or near the earth's surface in connection with seismic prospecting.

One of the methods of seismic prospecting involves the generation of seismic waves by dropping a heavy weight on the earth's surface at each of a plurality of impact points on a line between seismic wave detecting positions. Some of the seismic waves generated at a point of impact are transmitted down into the earth and are reflected by reflecting horizons or boundaries separating subsurface strata which have different physical properties. The reflected waves are detected at the earth's surface by geophones positioned at the detecting locations to produce electrical signals that are indicative of the detected seismic waves. The electrical signals are recorded on a recording medium to produce a seismogram. The resulting information may be examined by seismic computers or processed through electrical correlating apparatus to glean information useful in determining the physical properties and configuration of subsurface strata.

One of the problems incident to seismic prospecting utilizing the weight-dropping or thumping technique briefly described above, is that of interference with reflected waves by low velocity waves such as "ground roll" and waves produced by a resonance effect at the source point which produced repeated events on seismograms. The events produced by such interfering waves complicate the task of identifying true reflection events on seismograms. The interfering waves are particularly pronounced when seismic waves are generated at the earth's surface rather than below the weathered layer. Therefore, it is desirable to eliminate such waves as much as possible in connection with the weight-dropping technique for seismic prospecting.

Furthermore, it is known that the efficiency of seismic wave transmission through the earth is greatest at particular seismic wave frequencies. The exact frequency or band of frequencies for most efficient propagation of seismic waves varies somewhat, depending on the location at which the waves are generated. Generally speaking, this frequency or band of frequencies is between 15 and 35 cycles per second. The energy available from a falling weight for production of seismic waves is quite small. Therefore, at any given location at which seismic waves are produced by dropping a heavy weight on the earth's surface, it is desirable to concentrate most of the energy in a seismic impulse at the frequency or band of frequencies most efficiently transmitted through the earth from that location.

In accordance with the teachings of the present invention, a multisection weight is provided. Preferably, the laminations or plates are loosely interconnected so that they are vertically spaced apart by a distance such that each upper plate will produce a seismic impulse between .25 and 20 milliseconds after the next lower plate. The exact spacing between the plates is dependent on the particular seismic pulse shape desired, which in turn is dependent on the particular seismic wave frequency or band of frequencies to be emphasized. The multisection weight is dropped in substantially free fall. The lowermost plate will strike the earth's surface first, and the upper plates thereafter will successively impact the earth in succession progressing upwardly. As noted, each of the plates will produce an individual seismic impulse at a local area of the earth's surface; the individual impulses will combine to produce a composite seismic impulse. The shape of the composite impulse will be determined by the time delay between the individual impulses and by the relative weights of the plates.

Objects and features of the invention not apparent from the above discussion will become evident upon consideration of the following descriptive matter when taken in connection with the accompanying drawings, wherein.

Figure 13:
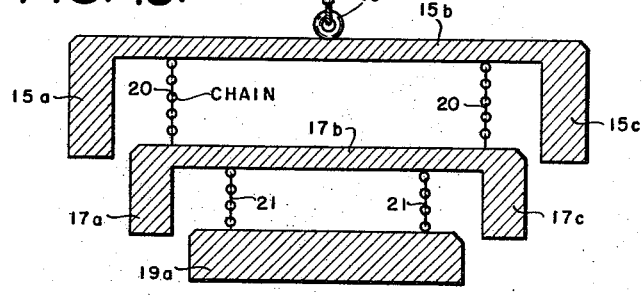
Figure 6:
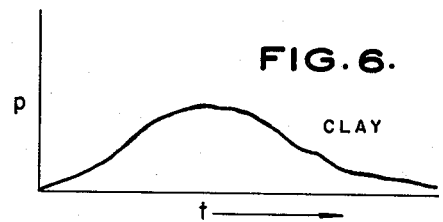
Figure 7:
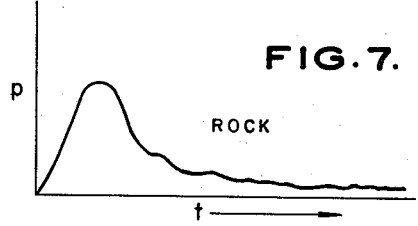
Figure 11:
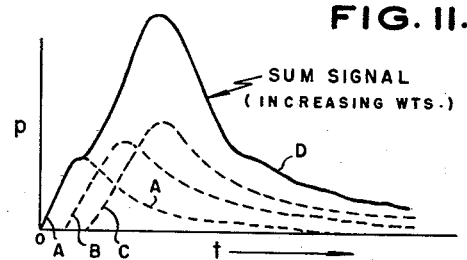

FIGS. 6 and 7 are rectangular coordinate illustrations of pressure at a point in the earth as a function of time when a single section heavy weight is dropped on the ground in clay and in rock, respectively; and FIGS. 8 through 12 are rectangular coordinate representations of pressure as a function of time at a point in the earth using the present invention under various operating conditions thereof;

FIG. 13 is a cross-sectional view of another type of weight in accordance with the invention.

Figure 1:
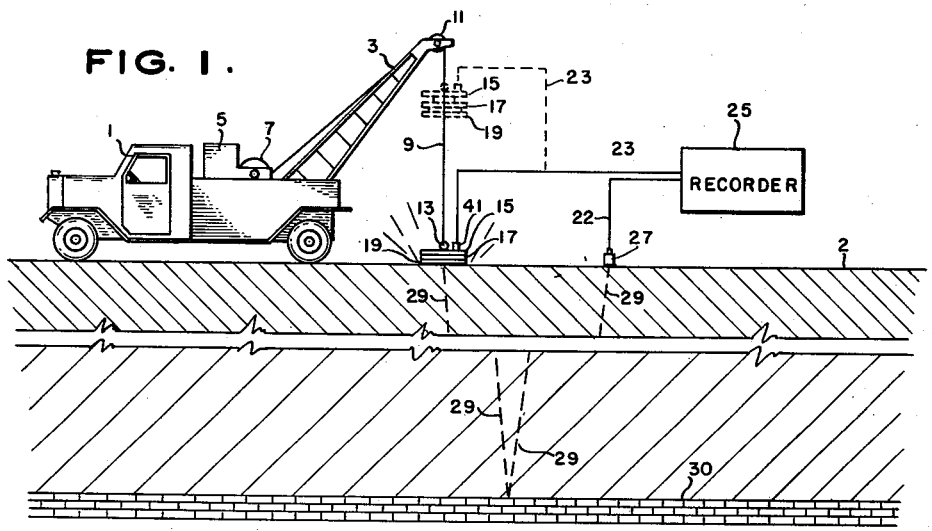
FIG. 1 is a schematic diagram, partially in cross section, of apparatus for performing a seismic observation in accordance with the teachings of the present invention.
Figure 2:
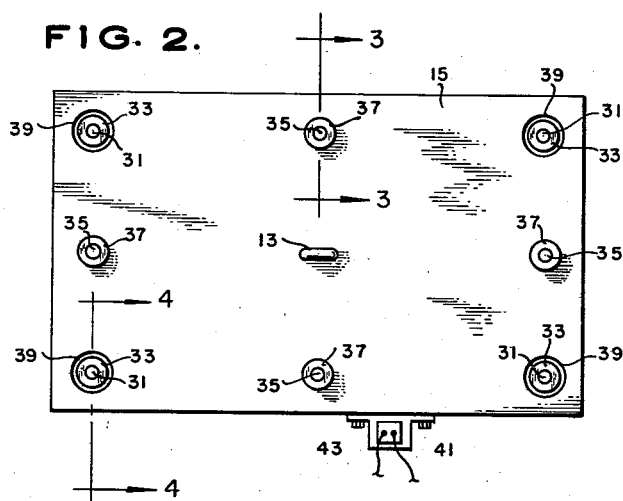
FIG. 2 is a top view of the laminated weight illustrated in FIG. 1.
Figure 3:
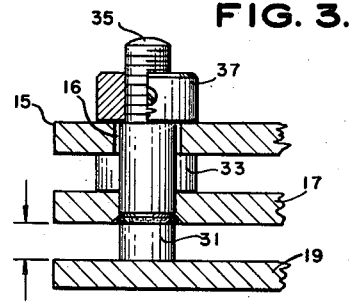
FIG. 3 is a fragmentary, cross-sectional view taken along section 3—3 of FIG. 2.
Figure 4:
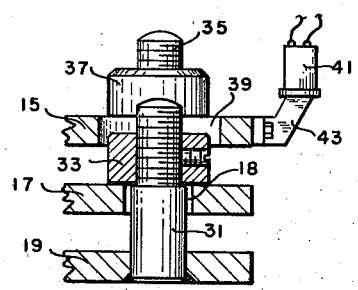
FIG. 4 is a fragmentary, cross-sectional view taken along section 4—4 of FIG. 2.

With reference now to FIG. 1, there is illustrated apparatus for making a seismic observation utilizing the weight-dropping or thumping technique, wherein a truck 1 at the earth's surface 2 is provided with a boom 3 affixed thereto and extending upwardly and outwardly therefrom. A reel mechanism 7, including a prime mover 5, is mounted on the truck bed, and an exceedingly strong line 9 adapted to wind on the reel extends from the reel over a pulley 11 at the end of the boom 3. At the end of the line 9 is connected a laminated weight illustrated as including three laminations or plates designated by the reference numerals 15, 17, and 19. A U-bolt or hook 13 is affixed to the center of the topmost plate 15 so that line 9 can be connected thereto. The plates 15, 17, and 19 are illustrated as being three in number; however, any plural number of plates may be used, depending upon the operating locale and conditions under which the equipment is to operate, as will become more evident from the following discussion. Preferably, the plates have substantially the same areal dimensions. By "areal dimensions" is meant all dimensions except thickness; i.e., length, width, radius, circumference, etc. As illustrated in FIGS. 2, 3, and 4, the adjacent plates are loosely connected together by spacer means comprising bolts 35 connected to middle plate 17 and extending through a hole 16 drilled in top plate 15, and a bolt 31 affixed to plate 19 and extending through hole 18 in plate 17 and an enlarged hole 39 in plate 15. The upper end of each of the bolts is threaded so as to threadedly engage a large nut designated by reference numerals 33 and 37 for bolts 31 and 35, respectively. The bolts 33 and 37 are substantially larger in diameter than the holes 18 and 16, respectively, so that the plates to which they are affixed will be supported by the plate immediately thereabove. By adjusting the nuts on the bolts, the spacing between adjacent plates may be varied. Holes 39 are provided in topmost plate 15 so that the lower plates can be easily spaced apart the desired distance and further to facilitate construction of the composite weight. It is manifest that each plate will carry the weight of all the plates therebelow.

As illustrated in FIGS. 1 and 4, a bracket 43 supporting an impact switch or accelerometer 41 is bolted or welded to a side of topmost plate 15. The function of the impact switch or accelerometer is to detect the moment of impact or peak pressure exerted by the weight to which it is affixed on the ground. The impact detecting device 41 is connected to the weight which it is calculated will exert pressure during the composite seismic pulse, as described below. However, usually it will be found that this is the topmost plate.

Auxiliary truck apparatus, such as apparatus for stabilizing the weight during moving operations and apparatus for preventing unreeling of the line 9 after the moment of impact, is described in U.S. Patent No. 2,897,907, Flatow et al., and will not be described herein.

In FIG. 1 there is further shown a geophone 27 stationed at a receiving location spaced apart on the earth's surface 2 from the transmitting location from which the weight is to be dropped. Electrical signals produced by the geophone 27 and by the impulse detecting device are transmitted on electrical leads 22 and 23, respectively, to a recorder 25. The recorder 25 may be of conventional design ordinarily used in making seismograms, and preferably is a magnetic tape recorder.

The general technique of conducting seismic observations with a heavy weight is described in U.S. Patent No. 2,851,121, McCollum. It is sufficient to say here that the heavy weight is dropped in substantially free fall to the earth's surface from the position illustrated by dashed lines in FIG. 1. Prior to the drop, the plates 15, 17, and 19 are spaced apart by a distance up to about six inches, in accordance with the particular seismic pulse shape desired. This is done by adjusting nuts 37 and 33 on bolts 35 and 31. Some of the seismic waves produced by the falling weight will be transmitted through the earth, such as along ray path 29, will be reflected from reflecting horizon 30, and will be detected by geophone 27. The moment of impact of the weight will be detected by impact detector 41 to provide a time reference in the usual manner. The moment of impact and the electrical output signals of geophone 21 are separately recorded by recorder 25. This procedure is followed at each of a plurality of impact points to produce a multitrace seismogram, as is described in Patent No. 2,851,121.

Figure 5:
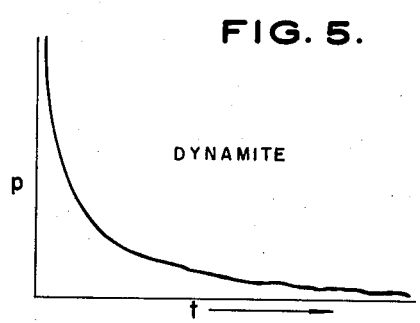
FIG. 5 is a rectangular coordinate illustration of pressure as a function of time at a point in the earth in the proximity of a dynamite blast.

The invention will be more completely understood with reference to the rectangular coordinate graphs of FIGS. 5 through 12. In each of the figures there is shown the relationship of pressure exerted on an earth particle in the immediate vicinity of a location at which a seismic impulse is generated for a particular seismic impulse generating condition. FIG. 5 illustrates a curve of the pressure vs. time produced by detonating a dynamite charge. It will be noted that initially the pressure is extremely great, and that the pressure decays rapidly with time. The seismic energy of such an impulse is concentrated in a frequency band near the lower end of the frequency spectrum under 35 cycles per second. As noted above, in this range seismic waves are inefficiently transmitted through the earth.

FIGS. 6 and 7 illustrate the pressure-time relationships produced by a nonlaminated heavy weight dropped on clay (FIG. 6) and on rock (FIG. 7). When a weight is dropped on clay, the seismic energy is distributed over a band of frequencies concentrated in the band between 15 and 30 cycles per second. When a heavy weight is dropped on rock to produce a pressure time relationship as is illustrated in FIG. 7, the energy usually will be found to be in the frequency range of from 35 to 50 cycles per second for rock such as limestone. It can be seen that it is desirable to concentrate as much of the energy as possible in a narrow band of frequencies in view of the fact that the total energy available from a falling weight is rather small in comparison to the energy available from dynamite.

Figure 8:
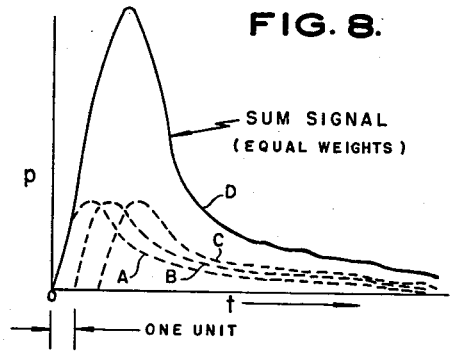
Figure 9:
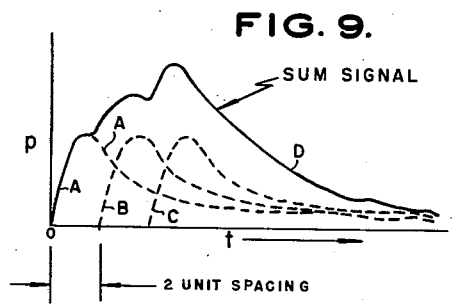
Figure 10:
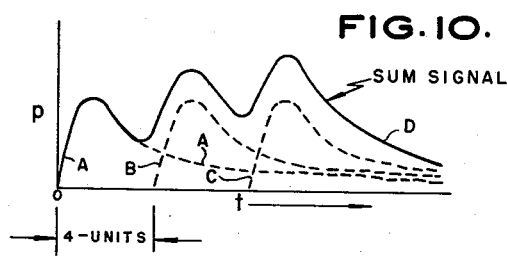
Figure 12:
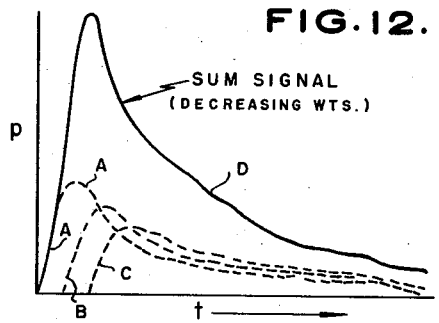

FIGS. 8 through 10 illustrate the pressure impulses such as may be produced in accordance with the present invention using a three-plate laminated weight dropped on limestone. The individual pressure curves designated A, B, and C on each of the drawings corresponds to the pressure impulses produced by plates 19, 17, and 15, respectively. With the spacing between the plates such that the pressure impulses by adjacent plates are one time unit apart (e.g., 5 milliseconds), a pressure curve designated by reference letter D in FIG. 8 may be produced. It is assumed that the plates are equal in weight for the relationship illustrated in FIG. 8 and also in FIGS. 9 and 10. In FIG. 9 the spacing between adjacent weights is such that the impulses produced thereby are two time units apart (e.g., 10 milliseconds). In FIG. 10 the spacing is such that the impulses are initiated four time units apart (e.g., 20 milliseconds). The wave shape of the composite impulses D are quite different, and the seismic energy produced thereby will be concentrated in different bands of frequencies. Thus, by adjusting the spacing between the plates, the band of frequencies over which the energy produced by the weights is concentrated can be varied at will. The frequency content can be further varied by making plate 17 heavier than plate 19, and plate 15 heavier than plate 17 so as to produce a composite waveform designated D in FIG. 11. The effect of increasing the weights in this manner is to move the band of frequencies in which energy is most concentrated to the high frequency side of the seismic spectrum. Conversely, as illustrated in FIG. 12, by making weight 19 heavier than weight 17, and weight 17 heavier than weight 15, the band of frequencies in the composite impulse can be moved to the low frequency side of the seismic spectrum.

In FIG. 13 there is illustrated another apparatus or assembly in accordance with the invention. The weight as illustrated comprises a lower plate 19a suspended from an intermediate plate 17b by chains 21, which intermediate plate 17b is in turn suspended from plate 15b by chains 20. Downwardly depending flanges 17a and 17c are affixed to opposed ends of plate 17b by welding (or the entire assembly may be cast in one piece). Similarly, flanges 15a and 15c depend from opposed ends of plate 15b. The flanges are sufficiently thick and strong to withstand the impact of striking the ground without buckling or being otherwise damaged. The flanges are sufficiently long to support the plate affixed thereto above the plate therebelow when the assembly is resting on the ground. Thus, there will be a gap between the plates to accommodate the chains. The force of impact on the ground from each of the upper weights thus is not transmitted through the plates immediately therebelow, but is transmitted directly to the earth in a given local area. Manifestly, the plates 19a, 17b, and 15b may be of many shapes, such as square and circular. If circular plates are used, a continuous annular flange may depend from the edges of the upper weights.

An unexpected advantage of the invention is the substantial reduction or almost complete elimination of ground roll. It has been observed that under almost all operating circumstances, practically no ground roll is produced when the present invention is utilized. It is believed that the seismic waves that contribute to production of ground roll produced by the individual plates tend to cancel each other when the plates are spaced apart in accordance with the present invention. However, no experimental evidence is available to substantiate this theory, and the true explanation may be otherwise than as indicated above. Interference with reflected waves produced by other types of interfering waves also may be substantially reduced by the invention.

The invention is not necessarily to be restricted to the specific structural details or arrangement of parts herein set forth, as various modifications thereof may be effected without departing from the spirit and scope of this invention.

The objects and features of the invention having been completely described, what is claimed is:

1. In the method of seismic exploration wherein artificially generated seismic waves are transmitted through the earth's crust from a transmitting location and are detected at at least one receiving location spaced apart from the transmitting location to produce electrical signals corresponding thereto, and wherein the electrical signals are recorded to form a multitrace seismogram, the improvement comprising: dropping in substantially free fall a heavy metal plate to the earth's surface; and after the plate has stopped freely falling, repetitively impacting the plate with forces of predetermined magnitude at intervals of between .25 and 20 milliseconds.

2. For use with apparatus for generating seismic waves in geophysical exploration, including a vehicle, a boom connected to said vehicle and extending upwardly and outwardly therefrom, pulley means near the upper extremity of said boom, and reel means on said vehicle adapted to bi-directionally reel a line connected thereto and extending through said pulley means, the improvement comprising: a multisection weight comprising a plurality of vertically spaced-apart plates; spacer means connected to at least one of each pair of adjacent plates adapted to space apart and loosely connect together said each pair of adjacent plates a predetermined distance; and connection means on the topmost of said plates adapted to connect the plates to the end of the line opposite the end connected to said reel.

3. The combination of claim 2 wherein the plates decrease in weight progressing in order from top to bottom.

References Cited in the file of this patent
UNITED STATES PATENTS

| | | |
|---|---|---|
| 2,108,731 | Thompson | Feb. 15, 1938 |
| 2,615,524 | Poulter | Oct. 28, 1952 |
| 2,851,121 | McCollum | Sept. 9, 1958 |
| 2,897,907 | Blount et al. | Aug. 4, 1959 |